Dec. 3, 1963  P. FROST ETAL  3,112,682
PHOTOGRAPHIC CAMERA WITH FILM-SPEED-INDICATING MEANS
Filed Nov. 21, 1960  3 Sheets-Sheet 1

Fig.1

INVENTORS:
PAUL FROST
FRIDOLIN HENNIG
BY
Michael S. Striker
Attorney

Dec. 3, 1963   P. FROST ETAL   3,112,682
PHOTOGRAPHIC CAMERA WITH FILM-SPEED-INDICATING MEANS
Filed Nov. 21, 1960   3 Sheets-Sheet 2

INVENTORS:
PAUL FROST
FRIDOLIN HENNIG
BY Michael S. Striker
Attorney

Dec. 3, 1963  P. FROST ETAL  3,112,682
PHOTOGRAPHIC CAMERA WITH FILM-SPEED-INDICATING MEANS
Filed Nov. 21, 1960  3 Sheets-Sheet 3

Fig.4

INVENTORS:
PAUL FROST
FRIDOLIN HENNIG
BY
Michael S. Striker
Attorney

United States Patent Office 3,112,682
Patented Dec. 3, 1963

3,112,682
PHOTOGRAPHIC CAMERA WITH FILM-SPEED-INDICATING MEANS
Paul Frost and Fridolin Hennig, Munich, Germany, assignors to Agfa Aktiengesellschaft, Leverkusen-Bayerwerk, Germany
Filed Nov. 21, 1960, Ser. No. 70,531
Claims priority, application Germany Nov. 21, 1959
19 Claims. (Cl. 95—10)

The present invention relates to cameras.

More particularly, the present invention relates to semi-automatic or fully automatic still or movie cameras.

In cameras of this type the setting of the elements which determine the exposure of the film is brought about either in a partly automatic fashion or in a fully automatic fashion. One of the factors which influences the setting of at least one of the exposure-determining elements of the camera is the speed of the film which is used in the camera. Thus, when the operator sets a fresh film spool into the camera, it is necessary to also set a film-speeding-indicating means at a value corresponding to the speed of the film which has been placed in the camera, and the setting of the film-speed-indicating means actuates one of the exposure-determining elements of the camera so that the factor of film speed is used in the determination of the exposure of the film. One of the principal defects encountered in semi-automatic or fully automatic cameras resides in the fact that the operator does not always remember to set the film-speed-indicating means at the value which corresponds to the speed of the film used in the camera, and as a result improper exposures are made.

It is accordingly a primary object of the present invention to provide a camera of the above type with a means which will reliably prevent the operator from forgetting to set the film-speed-indicating means at the setting which corresponds to the speed of the film which is in the camera.

A further object of the present invention is to provide a means which on the one hand will reliably prevent improper exposures resulting from failure to set the film-speed-indicating means at the proper setting and which on the other hand will not complicate the operation of the camera.

A further object of the present invention is to provide for a camera of the above type a means which will create the necessity for setting the film-speed-indicating means only in connection with replacement of exposed film with unexposed film.

It is furthermore an object of the present invention to provide a structure capable of accomplishing the above objects and at the same time composed of simple rugged elements which are very reliable in operation.

With the above objects in view the invention includes in a camera, a support means and an exposure-influencing means which is carried by the support means and which influences at least one of the factors which determine the degree of exposure. A film-speed-indicating means is carried by the support means and is accessible to the operator to be set manually at a position indicating the speed of the film used in the camera, and this indicating means is operatively connected with the exposure-influencing means to actuate the latter. A manually operable member is carried by the support means for movement between a picture-taking position and a non-picture-taking position, and a lock means is carried by the support means for movement between locking and unlocking positions. This lock means cooperates with the film-speed-indicating means for releasably locking the same at a film-speed-indicating position selected by the operator, and this film-speed-indicating means prevents movement of the lock means to its locking position unless the film-speed-indicating means is at a film-speed-indicating position. The lock means cooperates with the above-mentioned manually operable member to prevent the latter from moving from its non-picture-taking position into and remaining in its picture-taking position unless the lock means has moved to its locking position. Also, a spring means cooperates with the film-speed-indicating means to automatically place the latter in a non-lockable condition when the lock means unlocks the indicating means and the manually operable member is in its non-picture-taking position. The film-speed-indicating means is manipulated by the operator in opposition to this spring means to be placed in a lockable condition so that the spring means reminds the operator to set the film speed into the camera.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
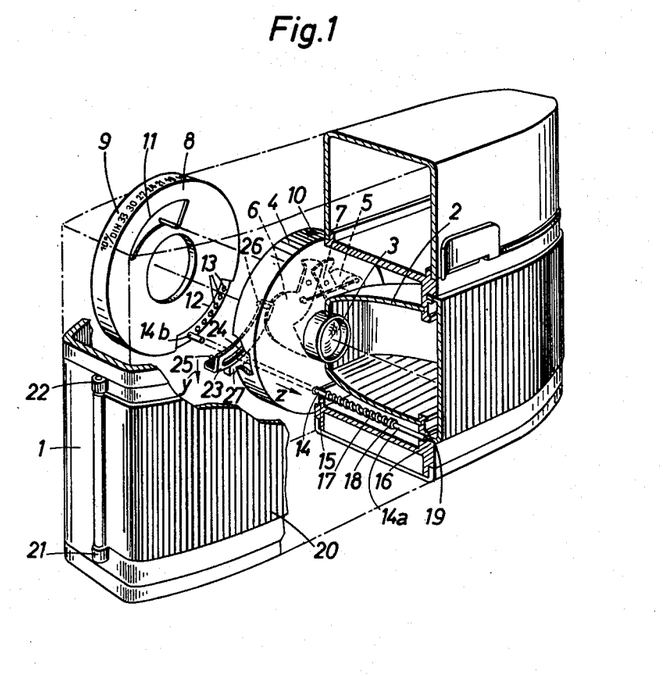
FIG. 1 is a fragmentary, perspective, partly diagrammatic and partly exploded view of one embodiment of a structure according to the present invention.

Referring to FIG. 1, there is illustrated therein a camera provided with an automatic diaphragm controlling device and including a camera housing 1 carrying in its interior a light tube 2 and an objective 3, the light tube directing the light which passes through the objective back to the focal plane. A housing 4 concentrically surrounds the objective and houses the automatic diaphragm setting structure as well as a between-the-lens shutter of known construction. The automatic diaphragm control structure includes the galvanometer 5 shown in dotted lines and electrically connected in a well known manner with an unillustrated photoelectric cell. FIG. 1 also shows diagrammatically in dotted lines the diaphragm blades 6 and 7 which are controlled by the electrical instrument 5.

In front of the housing 4 is located a manually operable indicating means 8 for indicating the film speed, and the indicating means 8 also extends concentrically around the optical axis and is in the form of an annular member. The adjustable indicating means 8 is provided with a scale 9 of film speeds and this scale cooperates with a stationary index 10 carried by the housing 4.

The structure of FIG. 1 includes an exposure-influencing means which is actuated by the indicating means 8, and in the embodiment of FIG. 1 the exposure-influencing means is the structure which determines the exposure time. The annular member 8 is formed with an exposure-time-influencing cam 11 which forms the exposure-influencing means and which engages a pin which projects from the housing 4 and forms part of a known exposure time controlling structure. Thus, as the cam or exposure-influencing means 11 moves with respect to this pin the exposure time will be regulated in accordance with the speed of the film which is used in the camera, the operator setting this film speed on the scale 9 in alignment with the index 10. Thus, with the embodiment of FIG. 1 there will be different exposure times for different film speeds, while the diaphragm will provide exposure apertures in accordance with the measured light intensity.

A lock means is provided for releasably locking the indicator means 8 at a selected film-speed-indicating position, and this lock means includes an arcuate portion of the member 8 which is formed with a series of openings. Thus it will be seen that the lower right portion of the member 8, as viewed in FIG. 1, is formed with an arcuate notch 12, and the rearwardly directed surface of the notch 12 is formed with an arcuate row of bores 13. The arcuate notch 12 and the arcuate row of bores 13 are located along a circle whose center is in the optical axis. The lock means includes in addition to the bores 13 an elongated lock rod 14 having a front end portion 14b which is adapted to enter into one of the openings 13 depending upon the setting of the annular member 8, and the cooperation of the rod 14 with one of the openings 13 serves to lock the element 8 against turning movement. The lock rod extends parallel to the optical axis and is longitudinally shiftable. The support means which is formed in part by the camera housing includes a pair of stationary bearings 15 and 16 through which the rod 14 extends so as to be longitudinally guided thereby. A coil spring 17 is coiled around the rod 14, bears at one end against the bearing 15, and bears at its other end against a collar 18 fixed to the rod 14, so that the spring 17 urges the rod 14 rearwardly in the direction of the arrows z to an unlocking position.

In the embodiment of FIG. 1, as in the other embodiments described below, there is a manually operable member supported for movement between a picture-taking position and a non-picture-taking position, and in the embodiment of FIG. 1 this manually operable member is formed by the door 20 of the camera. The door 20 is shown in FIG. 1 in its closed, picture-taking position. Of course, when the door 20 is open a proper exposure cannot be made and thus the door 20 is in its non-picture-taking position. It will be noted that the lock rod 14 of the lock means has a rear end 14a which abuts against a bottom flange 19 of the door 20. This door 20 at the rear of the camera housing is supported by hinges 21 and 22 and of course can be opened in a known way in order to remove exposed film and place unexposed film in the camera.

An arcuate member 23 extends into the arcuate notch 12 of the indicating means 8 and is movable out of this notch. The member 23 covers the openings 13 except when an arcuate slot 24 formed in the member 23 is aligned with these openings so that they are accessible through the slot 24 of the member 23. A pair of springs lock rod 14 is in an opening 13, this rod 14 extends through the slot 24 of the mebmer 23. A pair of springs 25 and 26 act on the member 23 to urge the latter downwardly in the direction of the arrow y of FIG. 1, and the elements 23–26 form a spring means which places the indicating means 8 in a non-lockable condition until the spring means is acted upon in a manner described below so as to place the indicating means 8 in a lockable condition. The element 23 has a finger piece 27 adapted to be engaged by the operator.

In the position of the parts shown in FIG. 1 the indicating means 8 is locked against turning, the member 23 is in the notch 12, the lock means is in its locking position with the front end 14b of the lock rod 14 located in an opening 13 and the rod 14 extends through the slot 24, and of course the camera door 20 is closed.

Assuming that the film in the camera has been exposed and is to be replaced by unexposed film, then of course the door 20 is opened and is thus in a non-picture-taking position. As a result the flange 19 moves away from the end 14a of the lock rod 14, and the spring 17 now moves the lock rod 14 rearwardly until the collar 18 engages the bearing 16. During this rearward movement of the rod 14 the front end 14b thereof first moves out of the opening 13 and then moves through and beyond the slot 24 so that the springs 25 and 26 will now move the member 23 downwardly and in the downward position of the member 23 the openings 13 are covered thereby since the slot 24 is out of line with the openings 13. The ring 8 carries at the opposite ends of the notch 12 brackets which are spaced beneath the element 23 when the slot 24 is aligned with the openings 13 and which engage the element 23 to limit its downward movement by the springs 25 and 26.

When new film has been placed in the camera, the operator will of course seek to return the manually operable member 20 to its picture-taking position, and thus the flange 19 will engage the lock rod 14 to move the latter forwardly, but this rod 14 will engage only the member 23 and it will not be possible for the operator to move the door 20 all the way to its closed position. Thus, the spring means 23–26 reminds the operator that the indicating means 8 has not been set at the film speed according to the new film which is placed in the camera. In order to place the member 20 in its picture-taking position it is necessary for the operator first to engage element 27 and raise element 23 in opposition to the springs 25 and 26 so that the lock rod 14 can move through the slot 24 into one of the openings 13, assuming that the ring 8 has been placed in an angular position where one of the indicia 9 is aligned with the index 10. When the operator holds the element 23 in the notch 12 with the slot 24 uncovering the openings 13, the operator can while engaging the finger piece 27 also turn the ring 8 to place the proper film speed value in alignment with the index 10. Of course, while the operator holds the member 23 in the position where the openings 13 are accessible through the slot 24, the door 20 can be moved to its closed position. Thus, it will be seen that the lock means 13, 14 cooperates with the manually operable member 20 to prevent movement of the latter from its non-picture-taking position to its picture-taking position unless the film-speed-indicating means 8 is located with a selected film speed aligned with the index 10, and in addition the spring means 23–26 must be manipulated in order to permit the lock means to move to its locking position so as to allow the manually operable member 20 to move to its picture-taking position, and in this way the operator is necessarily reminded about the film speed.

Figure 2:
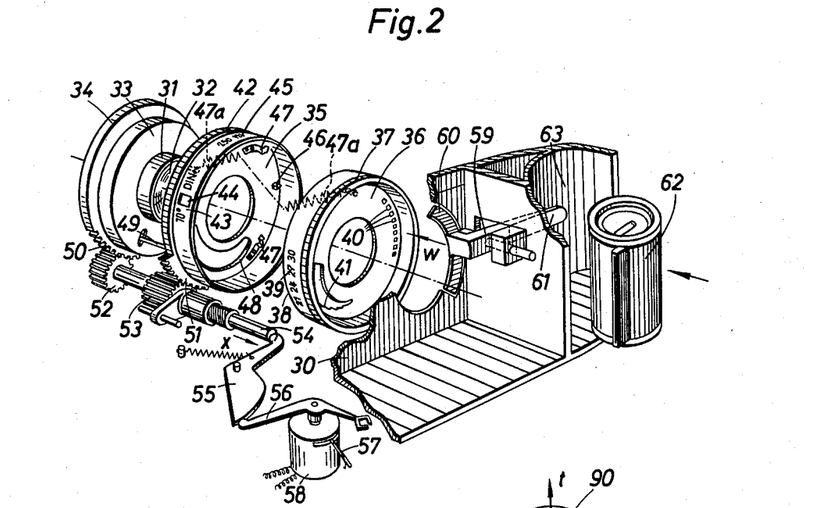
FIG. 2 is an exploded view of another embodiment of a structure according to the present invention, FIG. 2 showing only those parts of the camera which are necessary to an understanding of the invention.

FIG. 2 illustrates an embodiment where the invention is applied to a camera having a semi-automatic exposure controlling structure. Referring to FIG. 2, it will be seen that the front wall 30 of the camera fixedly carries a tube 31 which houses the objective 32 and which carries a housing 33. Within the housing 33 is located a conventional between-the-lens shutter as well as a conventional diaphragm. A diaphragm adjusting ring 34 is turnably carried by the housing 33. Also, a pair of adjusting rings 35 and 36 concentrically surround and are turnable on the tube 31, and the adjusting ring 36 is additionally axially shiftable in the direction of the arrow w. The adjusting ring 36 has an annular knurled portion 37 which facilitates manipulation of the ring 36, and in addition the ring 36 has an annular, forwardly directed flange 38 on which the scale 39 of film speeds is located. In addition, the ring 36 is provided with part of a lock means and for this purpose a portion of the ring 36 is formed with the arcuate row of openings 40. The exposure-influencing means of FIG. 2 which is actuated by the film-speed-indicating means is again a means for influencing the exposure time, and for this purpose the ring 36 is formed with a cutout having an exposure-time controlling cam 41 which forms the exposure-influencing means of this embodiment.

The adjusting ring 35 is also provided with a knurled portion 42, and the ring 35 includes a rearwardly directed annular flange 43 whose inner diameter is somewhat larger than the outer diameter of the flange 38. The rearwardly directed flange 43 surrounds the flange 38 and is formed with a window 44 through which a selected film speed value from the scale 39 is visible. The flange 43 carries at its exterior a scale 45 of exposure times. This latter scale cooperates with an unillustrated stationary index. At the rear surface of element 35 which is directed toward element 36 are located a lock pin 46 which forms with the row of openings a lock means as well as pressure springs 47 which serve to move the rings 35 and 36 apart from each other by a distance sufficient to locate the lock pin 46 out of any of the openings 40. Moreover, the ring 35 is formed with a cutout 48 through which an exposure time controlling pin 49 freely extends into engagement with the cam or exposure-influencing means 41 irrespective of the position of the parts. A spring 47a is connected at one end to the ring 35 and at its opposite end to the ring 36 so as to urge these rings with respect to each other to an angular position where the pin 46 is beyond the row of openings 40.

The diaphragm adjusting ring 34 is provided at its exterior with a gear segment 50, and the ring 35 is provided with a gear segment 51, and these gear segments mesh with the pinions 52 and 53, respectively, of a differential screw arrangement which adds together the angles of turning of the rings 34 and 35 so as to locate the shaft 54 of the differential screw means at an axial position determined by the combination of diaphragm and exposure time set into the camera. Such a differential arrangement is shown in Austrian Patent 204,386. Thus, the pinion 53 forms part of an internally threaded sleeve which is free to rotate but restrained against axial movement, while the shaft 54 is fixed to the pinion 52, extends through the sleeve, and has an outer threaded portion in threaded engagement with the inner threads of the sleeve. Thus, turning of either of the rings 34 and 35 will result in axial movement of the shaft 54. Thus, according to the particular combination of exposure time and exposure aperture set into the camera, the shaft 54 will move in the direction of the arrow $x$ of FIG. 2 or in the opposite direction and a spring keeps one end of a bell crank 55 in engagement with the free end of the shaft 54 so that the angular position of the bell crank 55 is also indicative of the combination of exposure time and exposure aperture set into the camera. This bell crank 55 engages with a camming edge thereof a lever 56 which is pivoted on the housing 58 of a galvanometer which is connected to an unillustrated photocell to be actuated thereby. The turning of the rotor of the galvanometer results in turning of the pointer 57, and the angular position of this pointer is thus indicative of light intensity. The lever 56 has a free end adapted to be aligned with the pointer 57, and of course this free end of the lever 56 and the pointer 57 are visible to the operator through a suitable window, for example. Thus, the operator will adjust the exposure time and/or the exposure aperture until the lever 56 has its end distant from the lever 55 aligned with pointer 57, and then the operator will know that a proper exposure will be made with the particular combination of exposure time and exposure aperture.

The ring 36 is adapted to be moved toward the ring 35 in opposition to the springs 47 by a pressure plate 60 of a manually operable member 59 which is supported for movement in the direction of the arrow $w$, parallel to the optical axis. This member 59 forms the manually operable member of FIG. 2 which is movable between a picture-taking position and a non-picture-taking position, and a free end 61 of the manually operable member 59 extends into the compartment 63 which is adapted to receive the spool 62 of film to be exposed.

Since there is no spool of film in the compartment 63 in the position of the parts shown in FIG. 2, the springs 47 hold the ring 36 rearwardly at a position where the lock pin 46 of the lock means is not in any one of the openings 40 and the spring 47a has located the ring 36 at an angular position where the pin 46 is beyond the row of openings 40. The exposure time controlling pin 49 is sufficiently long, however, so that it remains at all times in engagement with the cam or exposure-influencing means 41. Moreover, the ring 36 has acted through the pressure plate 60 on the manually operable member 59 to move the latter rearwardly to such an extent that the arm 61 extends into the compartment 63 within the space normally occupied by a spool of film in the camera.

Before introducing a fresh spool 62 of film to be exposed, the ring 36 is first turned with respect to the ring 35 until the film speed value of the film placed in the camera appears through the window 44. Now if the spool 62 is introduced into the compartment 63, this spool will engage the end 61 of the manually operable member 59 to move the latter from its non-picture-taking position forwardly to its picture-taking-position, and the pressure plate 60 will therefore engage the ring 36 to move the latter forwardly in opposition to the springs 47 to place the pin 46 in one of the openings 40, and thus the ring 39 has been locked at a position which indicates a selected film speed. Naturally, if a selected film speed is not aligned with the window 44, the pin 46 will not be aligned with any of the openings 40, and thus the operator will be reminded to set the film speed in the camera. Thus, it will be seen that with the embodiment of FIG. 2 the lock means 40, 46 also prevents movement of the manually operable member 59 back to its picture-taking position unless the film-speed-indicating means 39 has been placed at a selected position indicating a film speed. The stroke of member 59 when moving in the direction of the arrow $w$ of FIG. 2 to its picture-taking position is great enough to advance the ring 36 forwardly so as to locate the lock pin 46 in one of the openings 40 and thus place the lock means in its locking position. It will be noted that the opening 44 is elongated so that the film-speed value which appears through the window 44 remains visible during axial movement of the ring 36.

Figure 3:
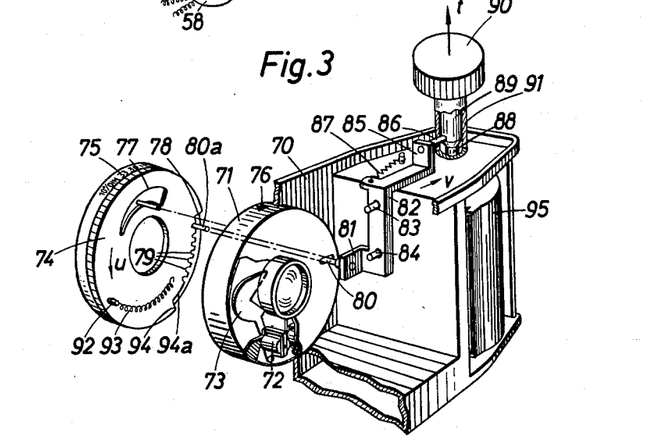
FIG. 3 is a fragmentary perspective and partly exploded view of a third embodiment of a structure according to the present invention.

According to the embodiment of the invention which is illustrated in FIG. 3, the camera has an automatic diaphragm controlling structure. This automatic diaphragm controlling structure corresponds generally to that described above in connection with FIG. 1. The front wall 70 of the camera housing carries an annular housing 71 which serves to house the diaphragm controlling structure as well as a between-the-lens shutter of known construction, and of course the annular housing 71 is concentric with the optical axis. Of the structure for controlling the diaphragm there is shown in FIG. 3 the galvanometer 72 and one of the diaphragm blades 73.

The exposure-influencing means 77 which influences the exposure and is actuated by the means for indicating the film speed is also in the embodiment of FIG. 3 the exposure time controlling structure, and a film-speed-indicating means 74 is provided, this means 74 being annular and turnably supported by the housing 71. The film-speed-indicating means carries a scale 75 of film-speed values adapted to cooperate with a stationary index 76 carried by the housing 71. The annular member 74 is provided with a cutout 77 having a camming edge which forms the exposure-influencing means and cooperates with the control pin of the exposure time adjusting means so as to position this control pin for providing a variation in the exposure time in accordance with the particular film speed of the film used in the camera.

The annular member 74 is provided at its rear surface which is directed toward the housing 71 with an arcuate notch 78 and with an arcuate row of recesses 79 which act as locking recesses, forming part of a lock means of the embodiment of FIG. 3, and which cooperate to provide a gear segment, as indicated in FIG. 3. These recesses 79 cooperate with the front end 80a of a lock rod 80, this lock rod 80 of the lock means being shiftable substantially radially with respect to the ring 74 into and out of a selected one of the openings 79 according to the particular film-speed value which is aligned with the index 76. The lock rod 80 extends through the housing 71 and is guided in slots formed in the walls of the housing 71. The rear end of the lock rod 80 is fixedly connected with an end 81 of an angle member 82 which is shiftable in the direction of the arrow *v* as well as in the opposite direction, and for this purpose a pair of stationary pins 83 and 84 extend through openings of the angle member 82 so as to guide the latter for movement to the right and left in the direction of the arrow *v* as well as in the reverse direction. At the end of the angle member 82 which is distant from its end portion 81, the member 82 is provided with an end portion 85 which fixedly carries a feeler pin 86. It will be noted that the end portions 81 and 85 extend at right angles to the portions of the angle member 82 to which they are connected, and the angle member itself is made up of a pair of arms which extend at right angles to each other.

A spring 87 is connected at one end to the member 82 and at its opposite end to a stationary pin, and this spring 87 urges the member 82 and thus the feeler pin 86 to the right, in the direction of the arrow *v* in FIG. 3, and the free end of the feeler pin 86 engages one or the other of a pair of shaft portions 88 and 89. These shaft portions are located one next to the other and are coaxial. They form different portions of the same shaft and the diameters of the shaft portions 88 and 89 are different, as is apparent from FIG. 3. Thus, it will be seen that the shaft portion 88 has a diameter smaller than the shaft portion 89, and these shaft portions are interconnected by a frustoconical part of the shaft so that the shaft 88, 89 can move axially in either direction while the pin 86 is maintained in engagement with the shaft by the spring 87. The shaft 88, 89 is fixed to and extends downwardly from a knob 90 which forms part of the rewind mechanism of the camera for rewinding film into the spool housing 95 after the film has been exposed, and the knob 90 together with the shaft portions 88 and 89 form the manually operable means of FIG. 3 which is movable between a picture-taking and non-picture-taking position. The shaft 88, 89 is located in a sleeve 91 which is stationary and which is formed with an axial slot through which the pin 86 extends into engagement with the shaft 88, 89, and this shaft is of course moved axially when the knob 90 is moved up or down by the operator. The difference between the radii of the shaft portions 88 and 89 of the shaft which is used for rewinding the exposed film is of such a magnitude when the pin 86 engages the shaft portion 89 which is of larger radius the end 80*a* of the rod 80 is in one of the recesses 79, while when the pin 86 engages the shaft portion 88 of smaller radius the end 80*a* is displaced to the right, as viewed in FIG. 3, completely out of the range of the recesses 79.

The rear surface of the film-speed-indicating means 74 fixedly carries a pin 92 to which a spring 93 is connected, and the end of the spring 93 distant from the pin 92 is fixed to the housing 71 and thus the spring 93 urges the indicating means 74 to turn in the direction of the arrow *u* of FIG. 3. The indicating means 74 will turn in the direction of the arrow *u* until the end 94 of the arcuate notch 78 reaches the end 80*a* of the lock rod 80, whenever the lock rod 80 has been displaced to the right from the position shown in FIG. 3 so as to be located beyond the range of the recesses 79.

FIG. 3 shows the structure in the position where the lock means 80 locks the film-speed-indicating means 74 against turning movement. The film spool housing 95 with the film therein is of course in the camera housing. Assuming now that the exposed film is to be exchanged for fresh, unexposed film, then the rewind knob 90 is pulled upwardly by the operator in the direction of the arrow *t*, and this will of course permit the housing 95 and the film therein to be removed and replaced by a spool of unexposed film. The upward movement of the knob 90 of course moves the shaft 88, 89 upwardly, and it will be noted that when the knob 90 is in its upper position it is not in a picture-taking position. The upward movement of the shaft 88, 89 with the knob 90 places the smaller shaft portion 88 at the elevation of pin 86 so that the spring 87 moves the pin 86 into engagement with the pin 88 and thus the lock means will move to its unlocked position where the end 80*a* of the lock rod 80 is located beyond the range of the recesses 79. As soon as the lock rod moves out of one of the recesses 79 the spring 93 turns the entire film-speed-indicating means so as to locate the end 94 of the notch 78 in engagement with the lock rod. Thus, the spring 93 forms a spring means which automatically places the film-speed-indicating means 74 in an unlockable condition, since when the end 94 of the notch 78 engages the lock rod this lock rod of course cannot be shifted into a locking position and thus the film-speed-indicating means 74 is at this time unlockable.

After a new spool of fresh unexposed film has been placed in the camera the operator will of course return the manually operable member 90 to its lower picture-taking position, and during the downward movement of the member 90 the shaft portion 88 of smaller diameter will move downwardly and the shaft portion 89 of larger diameter will be located at the elevation of the feeler pin 86. However, if the operator has not turned the film-speed-indicating means to the position where a selected one of the indicia 75 is aligned with the index 76, the operator will not be able to return the manually operable member 90 to its picture-taking position. When the operator attempts to move the member 90 downwardly the larger shaft portion 89 will seek to displace the member 82 and the lock rod 80 to the left, as viewed in FIG. 3, but at this time the edge 94*a* of the notch 78 will engage the lock rod to prevent the latter and the member 82 from moving to the left through a distance sufficient to enable the shaft portion 89 to be lowered to the elevation illustrated in FIG. 3, and thus the operator on the one hand will not be able to return the knob 90 to its lower position and on the other hand will know because of this fact that the film-speed-indicating means 74 must be set to enable the member 90 to be returned to the picture-taking position. Thus, the operator will turn the film-speed-indicating means 74 in opposition to the spring 93 until the film-speed value of the scale 75 is aligned with the index 76, and then while holding the indicating means 74 in the selected angular position the operator can move the member 90 downwardly to its picture-taking position and of course at this time one of the recesses 79 will be aligned with the lock rod 80 so that the end 80*a* thereof will move into this recess and the film-speed-indicating means 74 will be locked and the parts will have, for example, the position illustrated in FIG. 3.

Figure 4:
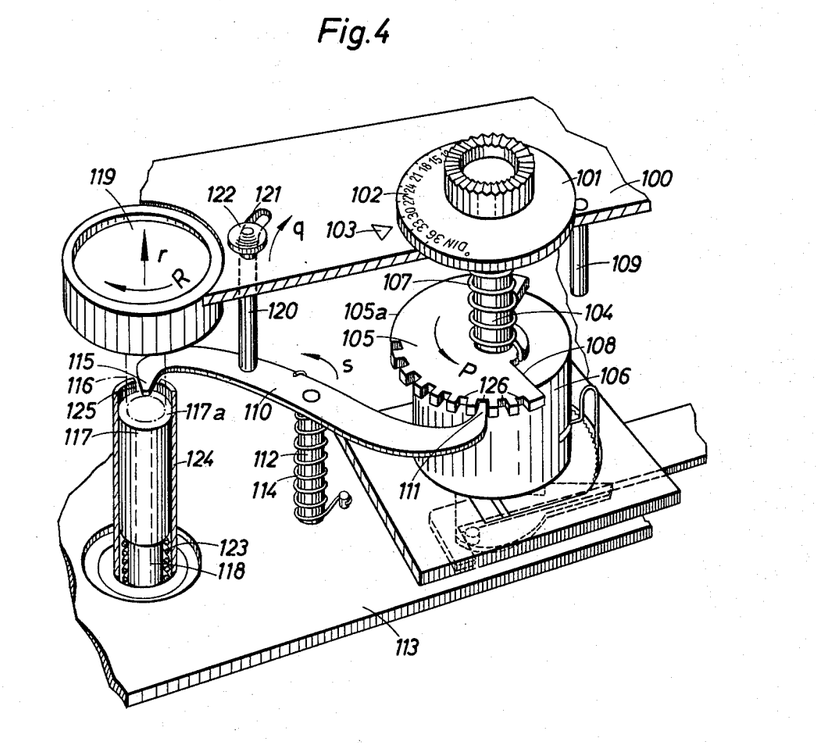
FIG. 4 is a perspective view of that part of a camera which includes a structure according to a fourth embodiment of the present invention.

The embodiment of the invention which is illustrated in FIG. 4 shows a fully automatic camera in the sense that the exposure is determined in a fully automatic manner. The uppermost wall 100 of the camera is shown in FIG. 4, and on this uppermost wall there is located a film-speed-indicating means formed by a disc 101 adapted to be manually turned and carrying a scale 102 of film-speeds, the graduations of the scale being adapted to be aligned with a stationary index 103 carried by the top wall 100 of the camera. The disc 101 is coaxially fixed to a vertical shaft 104 which at its bottom end is fixed to the housing 106 of a galvanometer, and the shaft 104 is also fixed to a gear 105 having the gaps 126 between its teeth, these gaps 126 forming the recesses of the lock means of the embodiment of FIG. 4. The teeth of the gear 105 extend only along a fraction of a circle, as is evident from FIG. 4. A spring 107 is coiled around the shaft 104, has its upper end fixed to the wall 100, and has its lower end fixed to the gear 105, and the spring urges the gear 105 to turn with the shaft 104 and the disc 101 as well as the housing 106 in the direction of the arrow *p* until the edge 108 of a sector-shaped cutout of the disc 105 engages a stationary pin 109 fixed to the wall 100 and extending downwardly therefrom into the path of turning of the edge 108 of the gear 105.

The lock means of the embodiment of FIG. 4 includes the lock lever 110 which has a free end portion 111 adapted to enter into one of the recesses 126 depending upon which of the graduations of the scale 102 is aligned by the operator with the index 103. The lever 110 is turnably supported intermediate its ends on the upper end of a shaft 112 which is fixedly carried by the wall 113 of the camera housing, and a spring 114 is coiled around the shaft 112, has one end fixed to the wall 113 and has its opposite end engaging an edge of the lever 110 so as to urge the latter to turn in the direction of the arrow s, so that the spring 114 urges the projection 111 into one of the recesses 126.

The lever 110 is of course a two-armed lever, and at the free end of the lever 110 distant from the end 111, the lever 110 has a projection 115 which is adapted to cooperate with a shaft 118 of the film rewinding mechanism, this mechanism including the knob 119 which forms in the embodiment of FIG. 4 the manually operable member which is movable between picture-taking and non-picture-taking positions. This shaft 118 is of course fixed to the knob 119, and the shaft 118 includes a pair of portions 116 and 117 of different diameters, the diameter of the portion 117 being larger than the diameter of the portion 116 so that the shaft has between the portions 116 and 117 an upwardly directed shoulder 117a.

A pin 120 is fixed to the lever 110 and extends upwardly therefrom through an arcuate slot 121 formed in the wall 100, and on the outside of this slot a manually engageable knob 122 or the like is fixed to the pin 120 so that the operator can manually turn the latter in the direction of the arrow q in opposition to the spring 114. The knob 122 forms for the operator a manually operable release which will release the knob 119 for upward movement in the direction of the arrow r.

The shaft 118 has a coil spring 123 coiled around the shaft beneath the portion 117 thereof of relatively large diameter, and of course the upper end of the spring 123 engages the downwardly directed shoulder formed at the lower end of the shaft portion 117, so that the spring 123 urges the shaft 118 and the knob 119 therewith upwardly in the direction of the arrow r. The shaft 118 is guided in a stationary sleeve 124 which is formed with an axially extending slot 125 through which the projection 115 of the lever 110 is adapted to extend, as illustrated in FIG. 4. With the parts in the position shown in FIG. 4 where the end 115 of the lever 110 engages the shoulder 117a, the spring 123 cannot move the shaft 118 and the knob 119 upwardly and the knob 119 remains in its lower picture-taking position illustrated in FIG. 4 where the upper end of the knob is flush with the wall 100 so that the knob is not accessible to the operator for rewinding of the film. The cooperation of the projection 115 and the shoulder 117a thus forms a releasable stop or latch structure for releasably maintaining the parts 118, 119 in their lower position shown in FIG. 4 in opposition to the spring 123.

When the film in the camera has been exposed so that it is to be exchanged for unexposed film, the operator moves the knob 122 in the direction of the arrow q, and this will result in a turning of the lever 110 in opposition to the spring 114 in a direction opposite to that indicated by the arrow s, and as a result the projection 115 will be displaced from the shoulder 117a so that at the same time the projection 111 moves out of whichever recess 126 it was located in. Thus, the manual turning of the knob 122 in the direction of the arrow q will release the shaft 118 to the spring 123 which now moves the shaft 118 and the knob 119 upwardly in the direction of the arrow r so that the operator can now grasp the knob 119 and rewind the exposed film. At the same time, because the projection 111 has moved out of the range of the recesses 126, the spring 107 turns the parts 101, 104, 105 and 106 in the direction of the arrow p until the surface 108 engages the pin 109. It should be noted that in this position of the parts the edge portion 105a of the gear 105 is aligned with projection 111, and since this edge portion 105a does not have any recesses the film-speed-indicating means 101 cannot be locked and thus the spring 107 forms a spring means which places the film-speed-indicating means in an unlockable condition.

After the rewinding of the exposed film is completed, the spool is removed from the camera and replaced by a new spool of unexposed film. At this time the film-speed-indicating means 101 must of course be set so that graduation of the scale 102 which corresponds to the speed of the film which is in the camera is aligned with the index 103. The operator will hold the disc 101 in the proper position in opposition to the spring 107 and will then depress the knob 119, and as soon as the shoulder 117a moves beneath the projection 115 the spring 114 will turn the lever 110 in the direction of the arrow s so that on the one hand the projection 115 will overlie the shoulder 117a and on the other hand the projection 111 will enter into that one of the recesses 126 which correspond with the particular graduation of scale 102 which has been placed by the operator in alignment with the index 103, and thus the lock means 110, 126 will be in its locking position locking the film-speed-indicating means 101, and of course this movement of the lock means to its locking position was possible only because the manually operable member 119 returned to its picture-taking position. It will be noted that if the operator forgets to turn the film-speed-indicating means 101 to a position where a selected value of scale 102 is aligned with the index 103 then the edge 105a will be aligned with the projection 111 and when the operator depresses the knob 119, the knob will not remain depressed and will be returned upwardly to its non-picture-taking position by the spring 123. Thus the operator will immediately know that the disc 101 must be set, and thus the spring 107 in effect acts to remind the operator that the film-speed-indicating means must be manipulated. Of course, the turning of the film-speed-indicating means will result in turning of the galvanometer housing 106 so as to influence the exposure. Thus, the exposure-influencing means 106 of FIG. 4 takes the form of a galvanometer whose angular position changes with a change in the setting of the film speed dial so as to influence the exposure. This galvanometer housing is connected electrically with an unillustrated photocell which registers the intensity of the light and moves the pointer of the galvanometer to a position which is indicative of the light intensity, and in accordance with the position of this pointer the exposure time and exposure aperture are set in a well known manner. By turning of the housing 106 with the disc 101 the factor of the film speed is introduced into the camera since the angular position of the housing 106 will of course change the angular position of the pointer of the galvanometer.

Although simple rewind knobs are shown in the embodiments of FIGS. 3 and 4, it is to be understood that the invention is not limited to such knobs and any type of quick-operating levers or film rewinding cranks or the like may be used. Also, the above-described combination of locking means with the film-speed-indicating means can be used with other types of semi- or fully automatic cameras.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, support means; exposure-influencing means carried by said support means and influencing at least one of the factors which determine the degree of exposure; film-speed-indicating means carried by said support means and accessible to the operator to be set manually at a position indicating the speed of the film used in the camera, said indicating means being operatively connected to said exposure-influencing means for actuating the latter; a manually operable member carried by said support means for movement between a picture-taking position and a non-picture-taking position; and lock means carried by said support means for movement between locking and unlocking positions and operatively connected to said indicating means for releasably locking the same at a film-speed-indicating position selected by the operator, said indicating means preventing movement of said lock means to said locking position unless said indicating means is at a film-speed-indicating position, and said lock means preventing said manually operable member from moving from said non-picture-taking position into and remaining in said picture-taking position unless said lock means has moved to its locking position.

2. In a camera, in combination, support means; exposure-influencing means carried by said support means and influencing at least one of the factors which determine the degree of exposure; film-speed-indicating means carried by said support means and accessible to the operator to be set manually at a position indicating the speed of the film used in the camera, said indicating means being operatively connected to said exposure-influencing means for actuating the latter; a manually operable member carried by said support means for movement between a picture-taking position and a non-picture-taking position; lock means carried by said support means for movement between locking and unlocking positions and operatively connected to said indicating means for releasably locking the same at a film-speed-indicating position selected by the operator, said indicating means preventing movement of said lock means to said locking position unless said indicating means is at a film-speed-indicating position, and said lock means preventing said manually operable member from moving from said non-picture-taking position into and remaining in said picture-taking position unless said lock means has moved to its locking position; and spring means cooperating with said indicating means for automatically placing the latter in a non-lockable condition when said lock means unlocks said indicating means and said manually operable member is in said non-picture-taking position, said indicating means being manipulated by the operator in opposition to said spring means to be placed in a lockable condition so that said spring means reminds the operator to set the film speed into the camera.

3. In a camera, in combination, support means; exposure-influencing means carried by said support means and influencing at least one of the factors which determine the degree of exposure; film-speed-indicating means carried by said support means and accessible to the operator to be set manually at a position indicating the speed of the film used in the camera, said indicating means being operatively connected to said exposure-influencing means for actuating the latter; a manually operable member manipulated by the operator in connection with replacing exposed film with unexposed film, said manually operable member being carried by said support means for movement between a picture-taking position and a non-picture-taking position; and lock means carried by said support means for movement between locking and unlocking positions and operatively connected to said indicating means for releasably locking the same at a film-speed-indicating position selected by the operator, said indicating means preventing movement of said lock means to said locking position unless said indicating means is at a film-speed-indicating position, and said lock means preventing said manually operable member from moving from said non-picture-taking position into and remaining in said picture-taking position unless said lock means has moved to its locking position.

4. In a camera, in combination, support means; exposure-influencing means carried by said support means and influencing at least one of the factors which determine the degree of exposure; film-speed-indicating means carried by said support means and accessible to the operator to be set manually at a position indicating the speed of the film used in the camera, said indicating means being operatively connected to said exposure-influencing means for actuating the latter; a manually operable camera door carried by said support means for movement between a closed, picture-taking position and an open, non-picture-taking position; and lock means carried by said support means for movement between locking and unlocking positions and cooperating with said indicating means for releasably locking the same at a film-speed-indicating position selected by the operator, said indicating means preventing movement of said lock means to said locking position unless said indicating means is at a film-speed-indicating position and said lock means cooperating with said door for preventing the latter from moving from said open to said closed position unless said locking means has moved to its locking position.

5. In a camera, in combination, support means; exposure-time-setting means carried by said support means for setting the exposure time; film-speed-indicating means carried by said support means and accessible to the operator to be set manually at a position indicating the speed of the film used in the camera, said indicating means being operatively connected to said exposure-time-setting means for actuating the latter; a manually operable door carried by said support means for movement between a closed, picture-taking position and an open, non-picture-taking position; and lock means carried by said support means for movement between locking and unlocking positions and cooperating with said indicating means for releasably locking the same at a film-speed-indicating position selected by the operator, said indicating means preventing movement of said lock means to said locking position unless said indicating means is at a film-speed-indicating position and said lock means cooperating with said door for preventing movement of the latter from said open to said closed position unless said lock means has moved to its locking position.

6. In a camera, in combination, support means including a portion of an objective assembly of the camera; an annular member supported for rotary movement by said portion of said objective assembly and carrying film-speed indicia, said support means including a stationary index adapted to cooperate with said indicia when the annular member is set at a selected film speed, said annular member having a camming portion which turns with said annular member and said objective assembly including an exposure-time-setting means acted on by said camming portion of said annular member, said annular member being formed along an arc of a circle whose center is in the optical axis with a series of openings respectively corresponding to the several film-speedindicia, said openings facing toward the rear of the camera; an elongated lock rod parallel to the optical axis and supported by said support means for axial movement, said rod having a locking position where a front end of said rod is located in one of said openings of said annular member and an unlocking position spaced rearwardly of said locking position where said front end of said rod is out of all of said openings; spring means cooperating with said rod for urging the latter rearwardly to said unlocking position thereof; and a camera door carried by said support means for turning movement between a closed, picture-taking position and an open, non-picture-taking position, said door having a portion engaging said rod at a rear end thereof and advancing said rod forwardly in opposition to said spring means to a forward position where said front end of said rod is located in one of said openings when said door is in said closed position thereof, whereby when said annular member is not set at a position indicating a film speed said openings are all out of line with said rod and said annular member therefore blocks movement of said rod to said forward position thereof and prevents closing of said door to remind the operator to set said annular member at a selected film speed.

7. In a camera, in combination, support means including a portion of an objective assembly of the camera; an annular member supported for rotary movement by said portion of said objective assembly and carrying film-speed indicia, said support means including a stationary index adapted to cooperate with said indicia when the annular member is set at a selected film speed, said annular member having a camming portion which turns with said annular member and said objective assembly including an exposure-time-setting means acted on by said camming portion of said annular member, said annular member being formed along an arc of a circle whose center is in the optical axis with a series of openings respectively corresponding to the several film-speed-indicia, said openings facing toward the rear of the camera; an elongated lock rod parallel to the optical axis and supported by said support means for axial movement, said rod having a locking position where a front end of said rod is located in one of said openings of said annular member and an unlocking position spaced rearwardly of said locking position where said front end of said rod is out of all of said openings; spring means cooperating with said rod for urging the latter rearwardly to said unlocking position thereof; a camera door carried by said support means for turning movement between a closed, picture-taking position and an open, non-picture-taking position, said door having a portion engaging said rod at a rear end thereof and advancing said rod forwardly in opposition to said spring means to a forward position where said front end of said rod is located in one of said openings when said door is in said closed position thereof, whereby when said annular member is not set at a position indicating a film speed said openings are all out of line with said rod and said annular member therefore blocks movement of said rod to said forward position thereof and prevents closing of said door to remind the operator to set said annular member at a selected film speed; and spring means cooperating with said annular member for placing the later in a non-lockable condition when said lock rod is in said rear position and said door is in said open position, said latter spring means being manipulated by the operator during turning of said annular member for placing the latter in a non-lockable speed-indicating position, and the manipulation of said latter spring means during actuation of said annular member placing the latter in a lockable condition.

8. In a camera, in combination, support means including a portion of an objective assembly of the camera; an annular member supported for rotary movement by said portion of said objective assembly and carrying film-speed indicia, said support means including a stationary index adapted to cooperate with said indicia when the annular member is set at a selected film speed, said annular member having a camming portion which turns with said annular member and said objective assembly including an exposure-time-setting means acted on by said camming portion of said annular member, said annular member being formed along an arc of a circle whose center is in the optical axis with a series of openings respectively corresponding to the several film-speed-indicia, said openings facing toward the rear of the camera; an elongated lock rod parallel to the optical axis and supported by said support means for axial movement, said rod having a locking position where a front end of said rod is located in one of said openings of said annular member and an unlocking position spaced rearwardly of said locking position where said front end of said rod is out of all of said openings; spring means cooperating with said rod for urging the latter rearwardly to said unlocking position thereof; a camera door carried by said support means for turning movement between a closed, picture-taking position and an open, non-picture-taking position, said door having a portion engaging said rod at a rear end thereof and advancing said rod forwardly in opposition to said spring means to a forward position where said front end of said rod is located in one of said openings when said door is in said closed position thereof, whereby when said annular member is not set at a position indicating a film speed said openings are all out of line with said rod and said annular member therefore blocks movement of said rod to said forward position thereof and prevents closing of said door to remind the operator to set said annular member at a selected film speed; an arcuate member overlapping the portion of said annular member which is formed with said openings and said arcuate member being formed with an arcuate slot through which said rod passes when said front end thereof is in one of said openings, and a spring acting on said arcuate member to displace the latter to a position locating said slot thereof out of line with said openings and covering said openings when said door is open and said rod is in its rear position so that said door cannot be closed and said rod cannot be moved forwardly to a locking position unless said arcuate member is placed by the operator in a position where the slot of said arcuate member uncovers said openings, so that said arcuate member reminds the operator to set the annular member at a position indicating the film speed.

9. In a camera as recited in claim 1, said support means including a camera housing portion having a compartment for a spool of film and said exposure influencing means being an exposure-time-setting means, said manually operable member when in said non-picture-taking position extending into said compartment to a degree requiring manual movement of said member to said picture-taking position thereof when a film spool is placed in said compartment by engagement with said film spool and manual insertion of the latter into said compartment.

10. In a camera as recited in claim 1, said support means including a portion of a camera housing formed with a compartment for a spool of film and said exposure-influencing means being an exposure-time-setting means, said film-speed-indicating means being in the form of an annular member carried by said support means for movement around the optical axis of the camera and having a camming portion cooperating with said exposure-time-setting means for participating in the setting thereof; an annular, second mannually operable member coaxial with said annular film-speed-indicating member and located next to the same, said annular second manually operable member being manipulated for setting a selected exposure time into the camera, said first-mentioned manually operable member extending into said compartment and in its non-picture-taking position being in the path of movement of a film spool into the compartment so that when the film spool is manually inserted into the compartment the film spool will engage and move said first-mentioned manually operable member from its non-picture-taking position to said picture-taking position, the latter being located forwardly of said non-picture-taking position, said first-mentioned manually operable member having a portion engaging said annular film-speed-indicating member for moving the latter forwardly; spring means between said second member and said film-speed-indicating annular member for urging the latter members apart from each other, said spring means acting through said annular film-speed-indicating member to place said first-mentioned manually operable member in said non-picture-taking position thereof, said lock means being formed by a portion of said annular film speed indicating member which is formed with a series of opening and a projection carried by said exposure-time-setting annular member which enters into one of said openings when said annular film-speed-indicating member is in a selected position indicating a selected film speed, the introduction of a film spool into said compartment moving the openings of the lock means formed by said portion of said annular film-speed-indicating member forwardly together with said film-speed-indicating member until said projection enters one of said openings to lock said annular film-speed-indicating member and said annular exposure-time-setting member to each other in opposition to said spring means.

11. In a camera as recited in claim 10, said annular exposure-time-setting member having a flange surrounding the indicia of said annular film-speed-indicating member and formed with an opening through which a selected one of said indicia is visible.

12. In a camera as recited in claim 1, said manually operable member being a rewind knob carried by said support means for movement between an inner picture-taking position and an outer non-picture-taking position.

13. In a camera as recited in claim 1, said exposure-influencing means being an exposure-time-setting means, said film-speed-indicating means being annular and carried by said support means for movement around the optical axis, said annular indicating means having a camming portion which actuates said exposure-time-setting means, said manually operable member being a manually operable film rewind knob carried by said support means for movement between an inner picture-taking position and an outer non-picture-taking position, said knob including a pair of successive shaft portions of different diameters and said lock means including an arcuate portion of said annular film-speed-indicating means which is formed with a series of teeth, a feeler member engaging said shaft portions of said knob and supported by said support means for movement toward said shaft portions, a spring acting on said feeler member to urge the latter toward said shaft portions, and a lock rod connected to said feeler member and having a free end adapted to extend into the space between a pair of said lock teeth when said knob is in said inner picture-taking position, the larger of said shaft portions engaging said feeler member when said knob is in said inner picture-taking position and said feeler member engaging the smaller shaft portion when said knob is in said outer non-picture-taking position, said rod being located out of the gaps between said teeth when said feeler member engages the smaller shaft portion, and said teeth cooperating with said rod to prevent movement of the latter into the gap between a pair of teeth unless said gap is aligned with said rod, and said gaps being respectively alignable with said rod only when a selected film speed has been set by the operator, whereby said knob cannot be moved to its inner picture-taking position unless said annular film-speed-indicating means has been set at a selected value.

14. In a camera as recited in claim 13, spring means cooperating with said annular-speed-indicating means for automatically turning the latter to a non-film-speed-indicating position when said knob is moved out to said non-picture-taking position thereof and said lock means unlocks said indicating means, whereby the operator must manipulate said film-speed-indicating means in opposition to said spring means to set a selected value of film-speed into the camera before said indicating means will be locked by said lock means and said knob will be capable of returning to its inner picture-taking position.

15. In a camera as recited in claim 1, said exposure-influencing means being a galvanometer housing turnably carried by said support means for influencing at least one of the factors which determine the degree of exposure, said indicating means being connected with said galvanometer housing for turning the latter when a selected film speed is indicated by said film-speed-indicating means, said manually operable member being a manually operable rewind knob carried by said support means for moving between an inner picture-taking position and an outer non-picture-taking position.

16. In a camera as recited in claim 15, said rewind knob including a pair of shaft portions located one next to the other and having different diameters and said lock means including a lock member turnably carried by said support means and having a locking position where a portion of said lock member engages a shoulder between said shaft portions to prevent outward movement of said rewind knob to said outer non-picture-taking position thereof; and a toothed sector fixed to said film-speed-indicating means for movement therewith, said lock member having a second projection cooperating with the teeth of said toothed sector to lock said film-speed-indicating means at a selected position, said first-mentioned projection of said lock member being incapable of moving into engagement with said shoulder unless said second-mentioned projection enters into the space between a pair of teeth of said toothed sector, so that said knob will not be held by said first-mentioned projection in said inner picture-taking position unless said lock means locks said film-speed-indicating means at a selected position.

17. In a camera as recited in claim 16, spring means cooperating with said knob for urging the latter outwardly to said non-picture-taking position thereof.

18. In a camera as recited in claim 16, and spring means cooperating with said toothed sector and said film-speed-indicating means for automatically turning the latter to a non-film-speed-indicating position where said sector presents no teeth which can be engaged by said second-mentioned projection of said lock member so that said film-speed-indicating means is placed by said spring means in a non-lockable condition, whereby the operator must move said film-speed-indicating means in opposition to said spring means to a selected film-speed before said indicating means can be locked by said lock member.

19. In a camera as recited in claim 16, spring means cooperating with said knob for urging the latter outwardly to said non-picture-taking position thereof; and manually engageable means operatively connected to said lock member for turning the latter to an unlocking position releasing said knob for movement outwardly by said spring means.

References Cited in the file of this patent

UNITED STATES PATENTS

| | | |
|---|---|---|
| 2,903,952 | Naumann | Sept. 15, 1959 |
| 2,931,281 | Dalton | Apr. 5, 1960 |
| 2,938,443 | Gunther | May 31, 1960 |
| 2,946,269 | Maiershofer | July 26, 1960 |
| 2,960,921 | Greger | Nov. 22, 1960 |
| 2,967,468 | Bretthauer | Jan. 10, 1961 |